United States Patent [19]

Powell et al.

[11] Patent Number: 4,984,536
[45] Date of Patent: Jan. 15, 1991

[54] FISH FEEDING APPARATUS

[76] Inventors: James W. Powell, Box 24 White Bluff Rd.; James E. Powell, 3246 Hammett Rd., both of Hogansville, Ga. 30230

[21] Appl. No.: 500,529
[22] Filed: Mar. 26, 1990
[51] Int. Cl.[5] ............................................. A01K 61/02
[52] U.S. Cl. ............................. 119/51.04; 119/51.11
[58] Field of Search ............... 119/51.03, 51.04, 51.11; 406/118, 137, 138, 146; 239/654, 655, 143; 222/637, 195

[56] References Cited

U.S. PATENT DOCUMENTS

| | | | |
|---|---|---|---|
| 671,303 | 4/1901 | Warren | 406/146 X |
| 727,030 | 7/1902 | Tilghman, Jr. | 406/146 X |
| 1,559,666 | 11/1925 | Bernier | 406/146 X |
| 1,559,810 | 11/1925 | Trent | 406/146 X |
| 1,618,395 | 2/1927 | Ward | 406/146 X |
| 3,179,378 | 4/1965 | Zenz et al. | 406/146 X |
| 3,514,905 | 6/1970 | King et al. | 406/118 X |
| 3,976,332 | 8/1976 | Fabel | 406/146 X |
| 4,381,898 | 5/1983 | Rotolico et al. | 406/118 |
| 4,561,808 | 12/1985 | Spaulding et al. | 406/118 |
| 4,582,254 | 4/1986 | Rotolico et al. | 406/118 X |

FOREIGN PATENT DOCUMENTS 308957  10/1933  Italy ................................ 43/147

Primary Examiner—Gene Mancene
Assistant Examiner—R. Thomas Price
Attorney, Agent, or Firm—Leon Gilden

[57] ABSTRACT

Apparatus for directing a predetermined and measured quantity of food to be distributed with a fish pond to systematically and periodically feed and distribute food therewithin to permit an individual absenteeism from such chores. The organization includes a bin to contain a reservoir and supply of feed therewithin with a blower motor and blower fan removed from the bin to prevent contamination of the motor from dust and debris from within the bin. A slotted conduit within the bin receives feed and wherein the feed is directed exteriorly of the bin by a pressurized conduit and coupling to direct pressurized air within the slotted conduit and direct such feed exteriorly of the bin onto the associated fish pond.

3 Claims, 4 Drawing Sheets

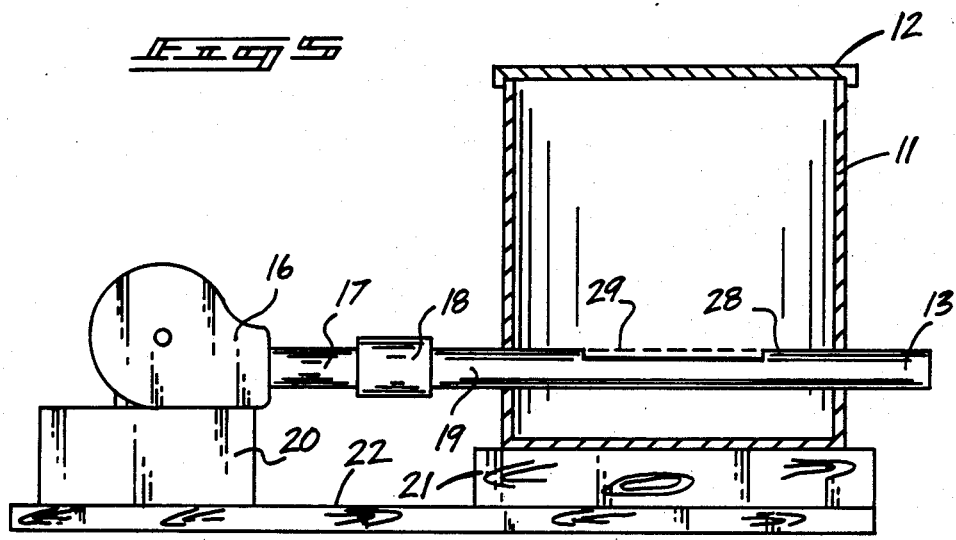
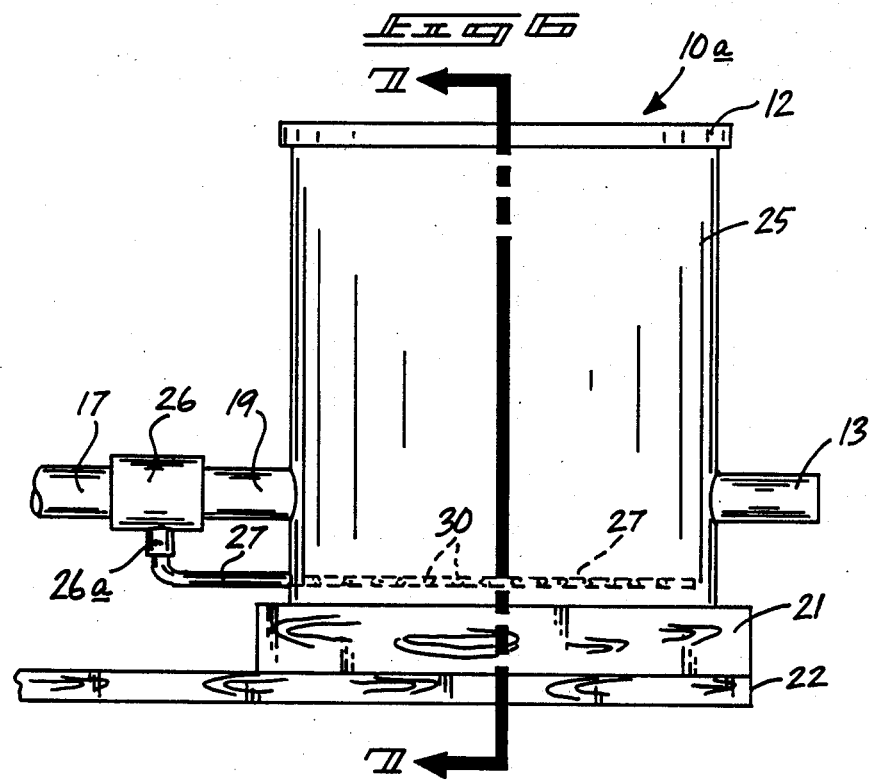

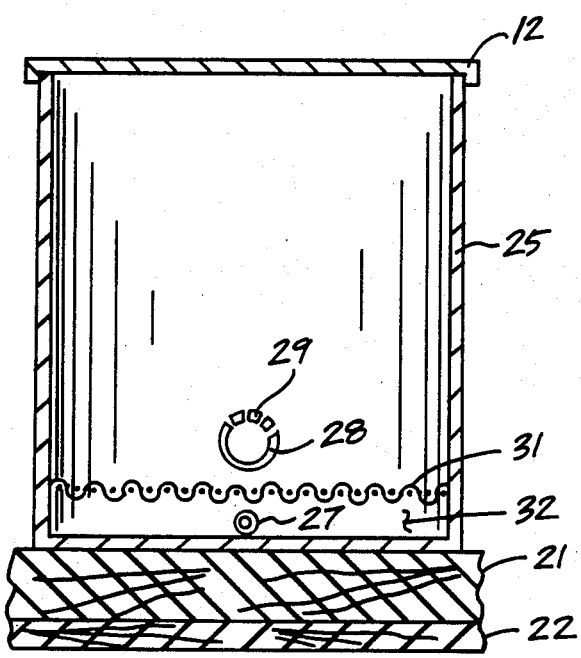
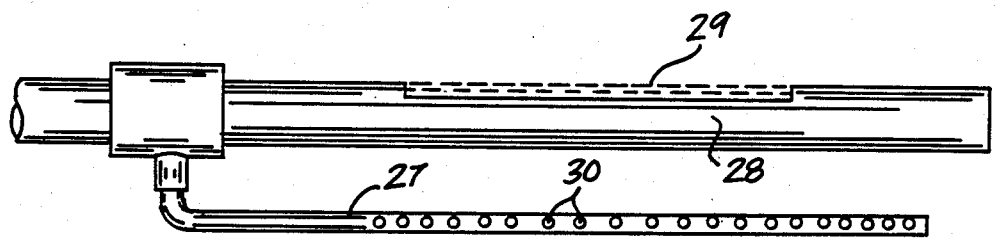

FISH FEEDING APPARATUS

BACKGROUND OF THE INVENTION

1. Field of the Invention

The field of the invention relates to fish feeding apparatus, and more particularly pertains to a new and improved fish feeding apparatus wherein the same directs feed from a bin and broadcasts the feed to a fish pond to enhance and maximize the raising of edible fish while enabling an individual to remain absent from that chore.

2. Description of the Prior Art

In the raising of fish by fish farms, a labor intensive chore requires the periodic and systematic feeding of fish. This requires an expense of manual labor and attention. To minimize such manual attention to raising of fish, various feed mechanisms have been developed in the prior art. For example U.S. Pat. No. 4,027,627 to FILLION sets forth a feeding organization wherein a hopper with an impeller to direct and broadcast feed from the hopper with an associated timing mechanism utilized to provide interval feeding from the organization onto a fish pond.

U.S. Pat. No. 4,279,220 to KUKURBA sets forth an automatic feeding device wherein the same utilizes an impeller to broadcast feed from an associated bin. The impeller is integral with the organization as typical of such prior art devices.

U.S. Pat. No. 3,786,784 to DILS, JR. et al wherein a fish feeding apparatus includes a conduit system with respective sections in communications with one another to define an elongate path of feed wherein adjacent sections are pivotable relative to one another to permit selective downward swing of a discharge end of the conduit to dispense feed out of the flow path.

U.S. Pat. No. 4,437,595 to STEVENS et al sets forth an apparatus utilizing an adjustable throw solenoid to reciprocate a slide member to permit periodic dispensing of feed from an associated hopper utilizing gravity.

U.S. Pat. No. 3,730,142 to KAHRS et al utilizes a fish feeding organization wherein a distribution plate mounted underlying a hopper overlying a fish feeding pond or body of water permits discharge of feed from the hopper by the positioning of a pendulum underlying the hopper to direct feed from an underlying dispensing plate to the body of water.

As such, it may be appreciated that there continues to be a need for a new and improved fish feeding apparatus wherein the same permits periodic and selective dispensing of feed from an associated hopper and moreover remotely positions a blower means relative to the feed hopper to permit prolonged effective life of the organization as well as efficient distribution of feed therefrom and in this respect, the present invention substantially fulfills this need.

SUMMARY OF THE INVENTION

In view of the foregoing disadvantages inherent in the known types of fish feeding apparatus present in the prior art, the present invention provides a new and improved fish feeding apparatus wherein the same utilizes a timing mechanism in association with a feed bin to selectively actuate a motor and an associated impeller to direct pressurized air through a feed conduit to dispense feed from within the hopper. As such, the general purpose of the present invention, which will be described subsequently in greater detail, is to provide a new and improved fish feeding apparatus which has all the advantages of the prior art fish feeding apparatus and none of the disadvantages.

To attain this, the fish feeding apparatus of the invention includes apparatus for directing a predetermined and measured quantity of food to be distributed within a fish pond to systematically and periodically feed and distribute food therewithin to permit an individual absenteeism from such chores. The organization includes a bin to contain a reservoir and supply of feed therewithin with a blower motor and blower fan removed from the bin to prevent contamination of the motor from dust and debris from within the bin. A slotted conduit within the bin receives feed and wherein the feed is directed exteriorly of the bin by a pressurized conduit and coupling to direct pressurized air within the slotted conduit and direct such feed exteriorly of the bin onto the associated fish pond. Modifications of the instant invention includes a pressurized conduit underlying the screen to provide aeration of feed within the bin to enhance drying and agitation of the bin and further provide for directing of feed within the slotted conduit to maximize usage of feed directed within the bin.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved fish feeding apparatus which has all the advantages of the prior art fish feeding apparatuses and none of the disadvantages.

It is another object of the present invention to provide a new and improved fish feeding apparatus which may be easily and efficiently manufactured and marketed.

It is a further object of the present invention to provide a new and improved fish feeding apparatus which is of a durable and reliable construction.

An even further object of the present invention is to provide a new and improved fish feeding apparatus which is susceptible of a low cost of manufacture with regard to both materials and labor, and which accordingly is then susceptible of low prices of sale to the consuming public, thereby making such fish feeding apparatus economically available to the buying public.

Still yet another object of the present invention is to provide a new and improved fish feeding apparatus which provides in the apparatuses and methods of the prior art some of the advantages thereof, while simultaneously overcoming some of the disadvantages normally associated therewith.

Still another object of the present invention is to provide a new and improved fish feeding apparatus which may be compactly stored when not being utilized.

Yet another object of the present invention is to provide a new and improved fish feeding apparatus wherein the same efficiently and effectively permits directing of feed from elongate conduit and dispensing the same overlying a fish pond.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is an orthographic view partially in section of the instant invention.

FIG. 6 is an orthographic side view taken in elevation illustrating a modified feed bin utilized by the instant invention.

FIG. 7 is an orthographic view taken along the lines 7—7 of FIG. 6 in the direction indicated by the arrows.

FIG. 8 is an orthographic side view taken in elevation illustrating details of the modified slotted conduit and associated aeration conduit utilized by the modified hopper of the instant invention.

DESCRIPTION OF THE PREFERRED EMBODIMENT

Figure 1:
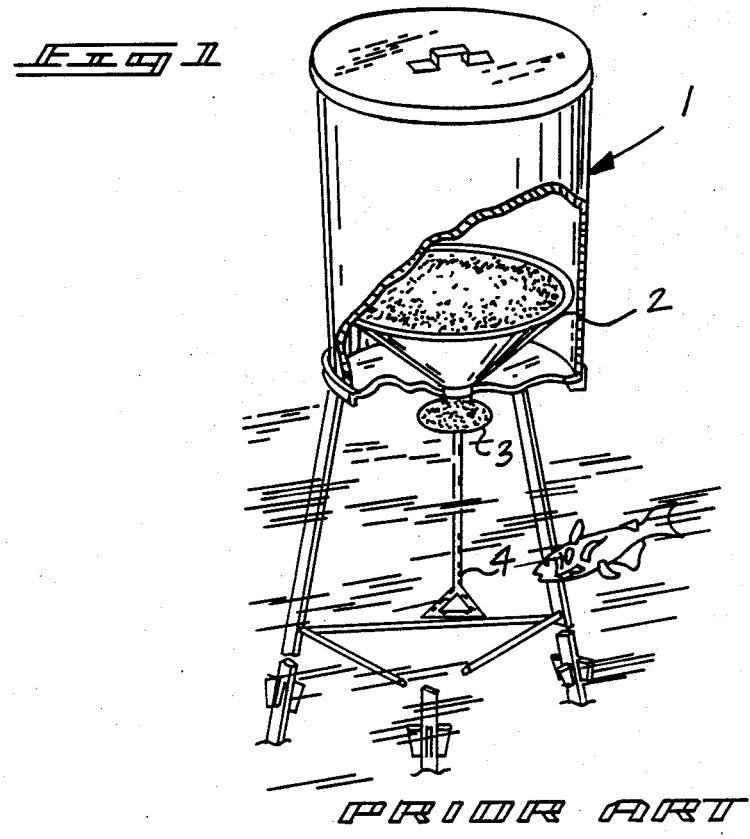
FIG. 1 is an isometric illustration of a prior art fish feeding apparatus.

With reference now to the drawings, and in particular to FIGS. 1 to 8 thereof, a new and improved fish feeding apparatus embodying the principles and concepts of the present invention and generally designated by the reference numerals 10 and 10a will be described.

Figure 2:
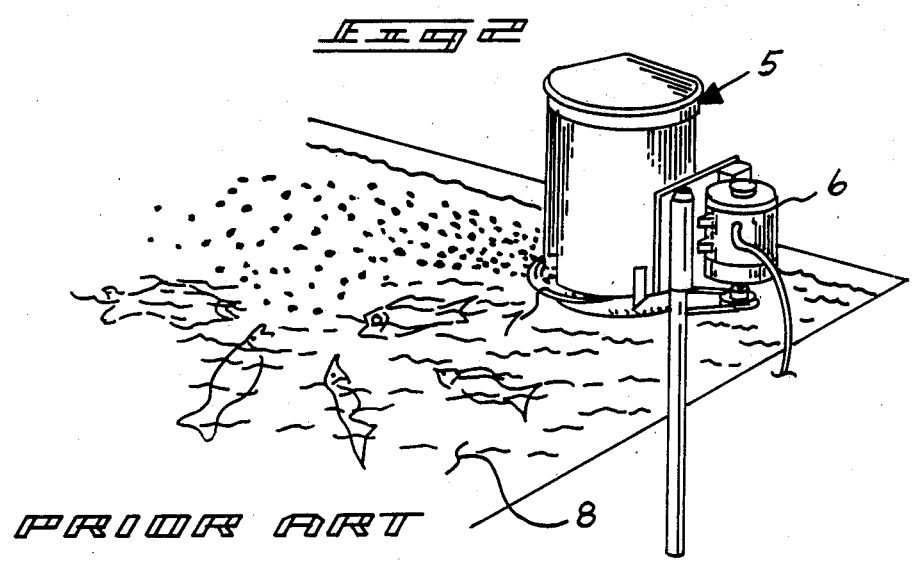
FIG. 2 is an isometric illustration of a further example of a prior art fish feeding apparatus.
Figure 3:
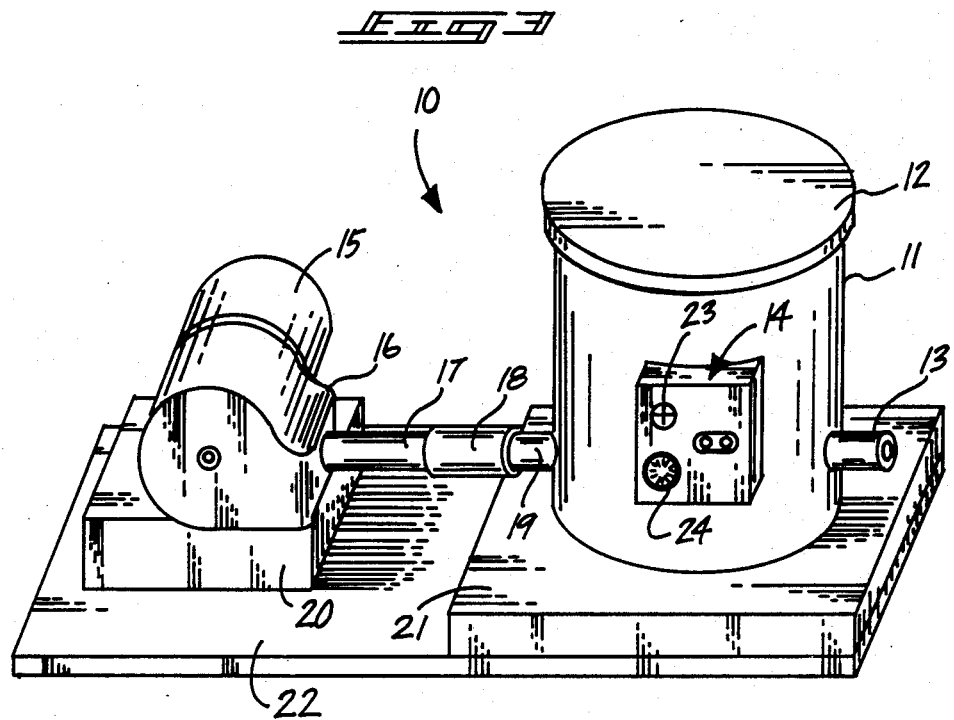
FIG. 3 is an isometric illustration of the instant invention.
Figure 4:
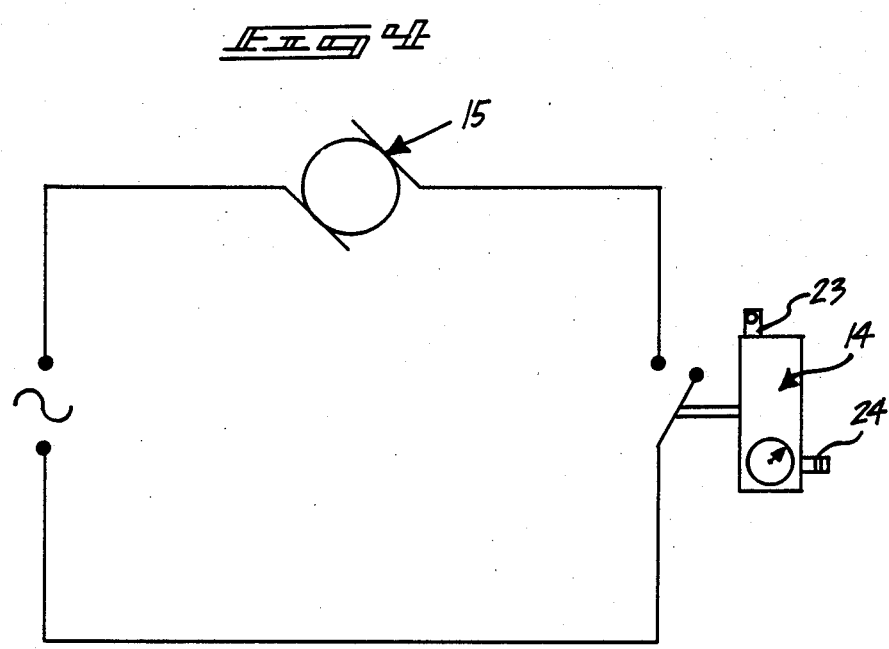
FIG. 4 is a diagrammatic illustration of a timer mechanism utilized by the instant invention.

FIG. 1 illustrates a modified fish feeding apparatus 1 utilizing a central bin with an internal feed funnel 2 to direct feed to an underlying dispensing dish 3. A pendulum 4 suspended interiorly of the dish 3 when agitated directs feed from the dish 3 to underlying fish pond as illustrated. FIG. 2 illustrates the use of a further fish feeding apparatus 5 wherein a bin dispenses feed from a discharge spout 7 wherein a timed motor mechanism 6 dispenses such feed to an associated fish pond 8. The organization utilizes an impeller to direct such feed where the impeller is mounted interiorly at a lowermost portion of the bin utilized by the invention as illustrated in FIG. 2.

More specifically, the fish feeding apparatus 10 of the instant invention essentially comprises an elongate feed bin 11 including a removable lid 12 mounted at an uppermost end thereof to permit selective filling of the bin 11 by a predetermined quantity of feed. The bin 11 includes a bin output conduit 13 that is positioned exteriorly of the bin 11 to direct feed from the bin 11 and broadcast that feed to an overlying surface of an associated fish pond such as the fish pond 8. The bin 11 further includes a timer mechanism 14 to selectively actuate a motor 15. The motor 15 is coupled to a centrifugal blower 16 wherein the blower 16 is in pneumatic communication with a blower output conduit 17. The blower output conduit 17 is secured in communication with a bin input conduit 19 by a resilient coupler 18. The resilient coupler 18 isolates the blower output conduit 17 from the bin input conduit 19. Further, isolation and remoteness of the blower 16 and motor 15 minimize contamination of the motor and blower mechanism by dust and the like that is found in use of feed wherein such feed dust intrudes within the mechanism of such delicate items such as a motor to limit its effective life cycle. The blower 16 and motor 15 are mounted to a blower base wherein the bin 11 is mounted to a hopper base 21 wherein each base 20 and 21 are each mounted in a spatial relationship relative to a main support 22. The main support 22 is thereupon positionable relative to the fish pond 8 to permit selective positioning of the organization and directing of the feed over the pond as desired.

It should be noted as illustrated in FIG. 5 for example that the bin input conduit 19 and the bin output conduit 13 are portions of a unitary conduit including a feed conduit 28. The feed conduit 28 is positioned interiorly of the bin 11 with the conduits input and projecting exteriorly of the bin defined as the input conduit 19 and the broadcasting portion of the conduit directing feed exteriorly of the bin 11 is defined as the bin output conduit 13. Actuation of the motor 15 is effected through the timer mechanism 14 utilizing a timer control member 24 to vary duration and sequencing of the timer 14 to actuate the associated motor 15 wherein an optional light sensor 23 may also be utilized to selectively actuate the timer during daylight hours of operation to avoid operation of the timer during evening hours.

FIGS. 6, 7, and 8 illustrate the use of a modified fish feeding apparatus 10a wherein the organization utilizes a modified bin member 25. A modified coupler 26 utilizes a secondary connector 26a to direct a predetermined quantity of pressurized air through an aeration conduit 27. The aeration conduit 27 projects interiorly of the bin 25 underlying the feed conduit 28 (see FIGS. 7 and 8) for example. The feed conduit 28 includes a slotted top arcuate surface 29 to accept feed therethrough where in a typical fashion, pressurized air directed from the centrifugal blower 16 mixes with feed within the feed conduit 28 that is received through the slotted top arcuate surface 29 to direct such feed through an output conduit 13. The modified bin 25 utilizes a screen grid 31 defined by a mesh to prevent feed from entering a cavity within the bin 25 defined within the bin underlying the screen grid 31. The aeration conduit 27 positioned underlying the screen grid 31 which is in turn underlying the feed conduit 28 directed pressurized air through a matrix of apertures 30 wherein this pressurized air from within the cavity 32 is directed upwardly through the screen grid 31 into feed within the bin 25 to effect a drying of such feed to enhance its distribution as well as directing feed within the feed conduit 28 during periods of low feed levels within the bin 25 when feed has accumulated below the slotted top arcuate surface 29.

As to the manner of usage and operation of the instant invention, the same should be apparent from the above disclosure and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A fish feeding apparatus comprising in combination,
   an elongate vertically oriented bin mounted to a main support, the bin including an output conduit directed exteriorly of the bin, and
   a feed conduit positioned within the bin in communication with the output conduit, and
   an input conduit in communication with the feed conduit wherein the input conduit is directed exteriorly of the bin spaced from the output conduit, and
   a blower means in communication with the input conduit for directing pressurized air into the input conduit and for pressurizing feed within the feed conduit to direct the feed and expel the feed through the output conduit, and
   wherein the input conduit, the feed conduit, and the output conduit are defined by a single conduit, and
   wherein the blower means includes an electric motor to drive an associated centrifugal blower and the motor is selectively operative through a timing mechanism to selectively actuate the motor to effect directing of pressurized air through the bin input conduit, and the centrifugal blower including a blower output conduit in an operative association with the bin input conduit, and
   including a resilient coupler mounted between the blower output conduit and the bin input conduit to vibrationally isolate the blower output conduit from the bin output conduit, and
   wherein the feed conduit includes a slotted top arcuate surface to receive metered feed within the feed conduit, and
   wherein the blower means is mounted to a blower support and the bin is mounted to a bin support and the blower support and the bin support are each fixedly mounted to the main support to permit unitary positioning of the bin and blower means relative to an associated fish pond to selectively direct and distribute feed to the fish pond, and
   wherein the resilient coupler includes a secondary connector wherein the secondary connector pneumatically associates the blower with an aeration conduit, and the aeration conduit is directed interiorly of the bin underlying the feed conduit.

2. Apparatus as set forth in claim 1 wherein the aeration conduit includes a matrix of apertures formed through the aeration conduit within the bin.

3. Apparatus as set forth in claim 2 further including a screen grid mounted between the feed conduit and the aeration conduit within the bin to define a cavity underlying the screen grid to permit pressurizing of the cavity and effect drying and turbulence within feed positioned within the bin.

* * * * *